United States Patent [19]
Nomura et al.

[11] Patent Number: 6,055,073
[45] Date of Patent: Apr. 25, 2000

[54] IMAGE PROCESSING APPARATUS

[75] Inventors: Shouichi Nomura; Toru Kawabe; Tuyosi Hattori, all of Hino, Japan

[73] Assignee: Konica Corporation, Tokyo, Japan

[21] Appl. No.: 09/039,898

[22] Filed: Mar. 16, 1998

[30] Foreign Application Priority Data

Mar. 21, 1997 [JP] Japan .................................. 9-067568

[51] Int. Cl.⁷ .................................................. G03F 3/08
[52] U.S. Cl. .......................... 358/518; 358/504; 382/167
[58] Field of Search .................................. 358/502, 503, 358/504, 505, 518, 520; 395/109; 382/167, 162

[56] References Cited

U.S. PATENT DOCUMENTS

| | | | |
|---|---|---|---|
| 5,329,385 | 7/1994 | Washio | 358/515 |
| 5,609,978 | 3/1997 | Giorgianni et al. | 430/30 |
| 5,664,072 | 9/1997 | Ueda et al. | 395/109 |
| 5,781,315 | 7/1998 | Yamaguchi | 358/520 |
| 5,812,243 | 9/1998 | Waibel et al. | 355/38 |
| 5,828,470 | 10/1998 | Maeda et al. | 358/504 |
| 5,909,506 | 6/1999 | Goto | 382/167 |
| 5,987,167 | 11/1999 | Inoue | 382/167 |

*Primary Examiner*—Kimberly A. Williams
*Assistant Examiner*—Derrick Fields
*Attorney, Agent, or Firm*—Frishauf, Holtz, Goodman, Langer & Chick, P.C.

[57] ABSTRACT

In an image recording apparatus provided with an image processor and an image recorder, the image processor has a memory for memorizing a reference converting condition for each color component, a correction value obtaining section for obtaining correction values for the image recording means for each color component, a converting condition calculating section for calculating an output converting condition for each color component based on both of the reference converting conditions and the correction values, and a converting section for converting the input image data into the output image data based on the output converting condition.

15 Claims, 8 Drawing Sheets

ARRANGEMENT DIRECTION

ARRANGEMENT DIRECTION

ARRANGEMENT DIRECTION

IMAGE PROCESSING APPARATUS

BACKGROUND OF THE INVENTION

The present invention relates to an image processing apparatus in which color image data composed of at least a color component are converted by an output conversion condition for each color component and output image data of each color component is obtained to output images from a specific image output apparatus.

Conventionally, an image processing apparatus, in which color image data composed of at least a color component are converted by an output conversion condition for each color component and output image data of each color component is obtained to output images from a specific image output apparatus, converts color image data by a fixed output conversion condition, and obtains output image data, in the first conventional technology. Further, in the second conventional technology, all data of the output conversion condition are obtained at any time or periodically, and image data are converted by the obtained output conversion condition, and output image data is obtained.

However, when an output level of a specific image output apparatus is varied, the first conventional technology can not cope with the variation of the output level, and there are problems in which images, whose balance of each color component is lost, are outputted, or density is varied higher or lower.

Further, although the second conventional technology can cope with the variation of output level of a specific image output apparatus, it is necessary to obtain the output conversion condition at any time or periodically. In order to obtain all data of the output conversion condition, there is a problem in which it is necessary to obtain the relationship between output data and print density, extending over many stages, and a great effort is necessary.

SUMMARY OF THE INVENTION

An object of the present invention is to obtain an output conversion condition easily, and to cope with the variation of the output level of a specific image output apparatus.

Problems of the present invention are solved by the structure described in following items. Each item will be described below. In this connection, explanation, overlapping with each cited item, will be omitted below.

Item 1.

An image processing apparatus in which color image data of each color component is converted by an output converting condition for each color component and output image data for each color component is obtained to output images from a specific image output apparatus, the image processing apparatus having a reference converting condition memory means to store the reference converting condition for each color component which is an output converting condition to be the reference of the specific image output apparatus; an output converting condition calculating means to calculate the output converting condition for each color component from the reference converting condition for each color component stored by the reference converting condition memory means, and correction values for each color component; an output conversion means to convert color image data of each color component by the output converting condition, calculated by the output converting condition calculating means, and to obtain output image data of each color component; and a correction value obtaining means to obtain a correction value for each color component.

According to the structure of Item 1, the output converting condition can be easily obtained by only obtaining the correction value for each color component and the apparatus can cope with the output level variation of the specific image output apparatus.

Item 2.

The image processing apparatus described in Item 1, in which the specific image output apparatus outputs an image by exposing photosensitive material by light emission of a light emitting portion of an exposure head, while the exposure head, in which a plurality of light emitting portions are arranged one row of or a plurality of rows of dotted line-like, and the photosensitive material are relatively moved, and has a light receiving unit to receive light emission of the light emitting portion of the exposure head and to output the light receiving data; and the correction value obtaining means obtains a correction value for each color component according to light receiving data outputted by the light receiving unit.

By the structure of Item 2, the output converting condition can be very easily obtained, and the apparatus can cope with variation of the light emitting condition of the exposure head which is an output level of the specific image output apparatus.

Item 3.

The image processing apparatus described in Item 2, in which the correction value obtaining means stores light receiving data, which is a reference, and the correction value for each color component is obtained according to stored light receiving data, which is a reference, and light receiving data outputted from the light receiving unit.

By the structure of Item 3, because the correction value obtaining means stores light receiving data, which is a reference, a correcting operation is not necessary, the output converting condition can be very easily obtained, and the apparatus can cope with the variation of the light emitting condition of the exposure head, which is the output level of the specific image output apparatus.

In this connection, it is preferable that light receiving data to be a reference is obtained according to light receiving data outputted by the light receiving unit under the condition that the exposure head of the specific image output apparatus is a reference.

Item 4.

The image processing apparatus described in Item 1, in which reference output image data is obtained from the reference image data stored in a reference image data memory medium which stores the reference image data, and the correction value obtaining means obtains the correction value for each color component according to the measurement result of a shade of color of the test print, obtained by outputting the image from the specific image output apparatus by using the reference output image data.

By the structure of Item 4, the output converting condition can be very easily obtained, and the apparatus can cope with the variation of the output level of the specific image output apparatus.

Item 5.

The image processing apparatus described in Item 1, in which the reference output image data is obtained from the reference image data stored in the reference image data memory medium which stores reference image data of one or a plurality of mono-color images, and which has a coincidence information input means to input coincidence information which specifies a combination of a mono-color image between a mono-color image or a test print and a standard chart print, which are most similar to each other, when the test print of one or a plurality of mono-color images, obtained by outputting the image from the specific image outputting apparatus using the reference output image data, is compared to the standard chart print in which a plurality of mono-color images are recorded; a memory means to store the correction value for each combination of the mono-color images between the mono-color image or the test print and the standard chart print, wherein the correction value obtaining means reads the correction value, stored by the memory means, corresponding to the combination of the mono-color images between the mono-color image or the test print and the standard chart print, which is specified by the coincidence information inputted by the coincidence information input means.

By the structure of Item 5, the output converting condition can be very easily obtained even when expensive devices such as a densitometer, measuring instrument, etc., are not used, and the apparatus can cope with the variation of the output level of the specific image output apparatus, and the variation of development processing.

Item 6.

The image processing apparatus described in Item 5, wherein the reference image data is data for image outputting either one of a plurality of mono-color images of the almost neutral color in which the neutral color density is different from each other, or a plurality of mono-color images in which the neutral color density is equal to each other and the image tone is different from each other, and the standard chart print records the other of a plurality of mono-color images of the almost neutral color in which the neutral color density is different from each other, or a plurality of mono-color images in which the neutral color density is equal to each other and the image tone is different from each other.

By the structure of Item 6, the finer setting can be very easily carried out, the output converting condition can be very easily obtained, and the apparatus can cope with the variation of the light emitting level of the exposure head, which is the output level of the specific image output apparatus, and the variation of development processing.

Item 7.

The image processing apparatus written in any of Items 1–6, in which the output converting condition is calculated by the following equation, when output image data of each color component is expressed by antilogarithm values, and when color image data of each color component is expressed by D, the reference converting condition is expressed by f(D), the correction value for each color component is expressed by C, and the output converting condition T is expressed by F(D).

$$F(D)=C \times f(D)$$

By the structure of Item 7, the output converting condition can be obtained by the very simple calculation, and the apparatus can cope with the variation of the output level of the specific image outputting apparatus.

Item 8.

The image processing apparatus written in any of Items 1–7, in which the color components are blue, green and red.

According to the structure of Item 8, the output converting condition can be easily speedy obtained and the apparatus can cope with the output level variation of the specific image output apparatus.

Item 9.

The image processing apparatus written in any of Items 1–8, in which the image recording means exposes a silver halide light sensitive material so as to form the color image.

According to the structure of Item 9, the apparatus can cope with the output level variation of the specific image output apparatus.

Item 10.

The image processing apparatus, in which the memory memorizes plural reference converting conditions, the converting condition calculating means calculates plural output converting conditions based on the plural reference converting conditions and the correction values.

According to the structure of Item 10, for example, even if a plurality of reference converting conditions are set for a plurality of input image sources, a single set of correction values are enough for the variation of the image output apparatus, maintenance can be conducted simply for the image recording apparatus.

Explanation of Technical Terms

In the present invention, "color component" means kinds of image carriers used for image formation, for example, three color components of B(blue), G(green) and R(red) in an ordinary color photographic or a single component of a white-black photographic. Further, "output conversion condition" means a processing condition with which conversion process is applied to input data so as to obtain output data value, for example, LUT (look-up table) in which output value corresponding to input data are recorded or a converting formula for input and output data may be used as the output conversion condition.

AS "a plurality of light emitting portions are arranged one row of or a plurality of rows of dotted line-like", the followings are listed: as shown in FIG. 1(a), a plurality of light emitting portions are arranged one row of dotted line-like; as shown in FIG. 1(b), a plurality of light emitting portions are arranged two rows of dotted line-like; as shown in FIG. 1(c), a plurality of light emitting portions are arranged three rows of dotted line-like, or similar arrangement. In this connection, in FIGS. 1(b) and 1(c), the light emitting portions are arranged in different positions with respect to the arrangement direction, however, a plurality of rows of the light emitting portions may be arranged in the same position.

In the present invention, the mono-color image means that the image has a constant density for each color component, ranging over a certain positional area, that is the image of mono-color. For example, when the color components are composed of three colors of blue green and red, the followings are listed: the image has the density in which the density of B is 1.5, the density of G is 1.0, the density of R is 0.5, which are constant, ranging over a certain positional area; or the density of B is 0.2, the density of G is 0.2, the density of R is 0.2, which are constant, ranging over a certain positional area As the antilogarithm value, for example, the value of brightness, exposure time in the case of constant exposure intensity, exposure intensity in the case of constant exposure time, reflectance, transmission factor, etc., are listed.

DETAILED DESCRIPTION OF THE PREFERRED EMBODIMENT

An example of concrete examples according to the present invention will be shown as an embodiment below, however, the present invention is not limited to the example. Further, in the example, although conclusive expressions are used for the terminology, these show a preferable example of the present invention, and meanings of terminology or technological scope of the present invention are not limited to them.

EXAMPLE 1

Figure 1:
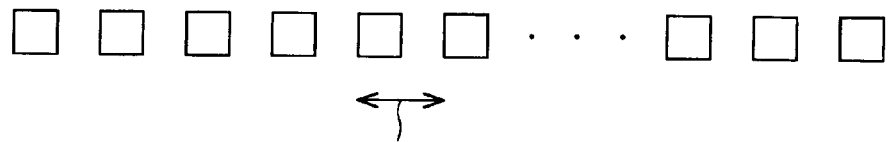
FIGS. 1(a)–1(c) are views showing examples of a plurality of light emitting portions which are arranged in one row or in a plurality of rows.
Figure 1:
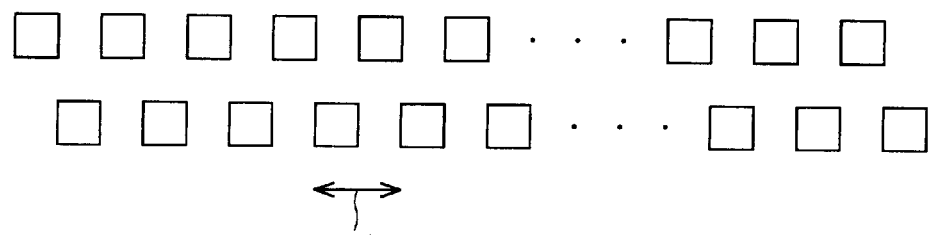
Figure 1:
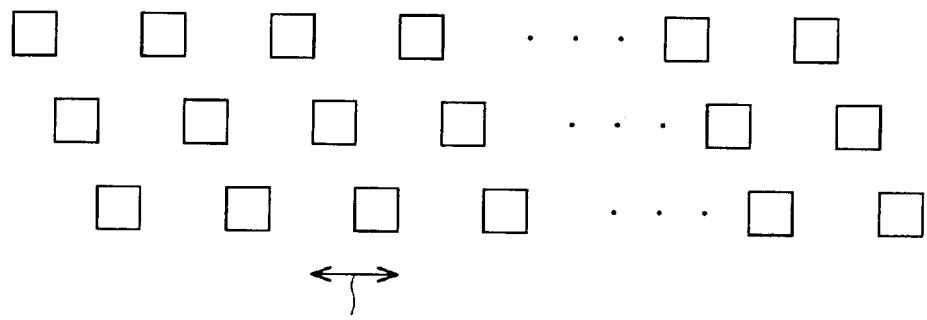
Figure 2:
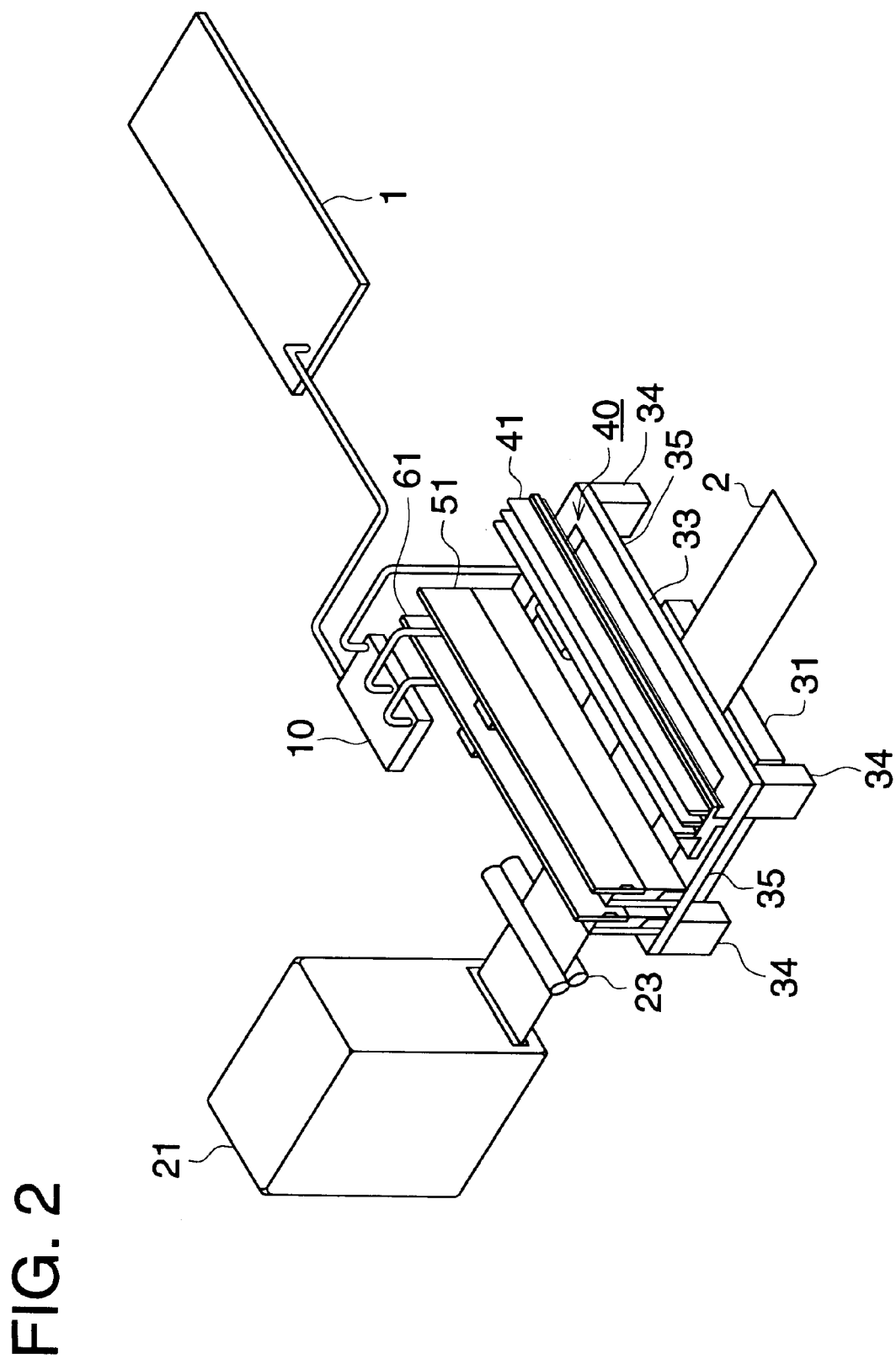
FIG. 2 is a general perspective view of an image recording apparatus of Example 1.

An image recording apparatus of the present example, in which an image processing apparatus, which is an example of an image processing apparatus of the present invention, is accommodated, will be described below. In the image recording apparatus, an exposure head, in which a plurality of light emitting portions are arranged one row of or a plurality of rows of dotted line-like, is fixedly provided. The image recording apparatus records an image by exposing photographic paper which is conveyed in the direction perpendicular to the arrangement direction of the light emitting portions of the exposure head, and which is silver halide color photographic photosensitive material, by light emission from each light emitting portion of the exposure head. The image recording apparatus is a many and unspecified operator usable image recording apparatus such as, for example, a portrait photographic apparatus or a self-operation type photographic printing apparatus, which is operated by many and unspecified customers for recording the image, and the apparatus need not be always controlled by a controller. Referring to FIG. 2, which is a general perspective view of the image recording apparatus of the present example, the image recording apparatus will be described below.

An image processing apparatus 1 converts inputted color image data of image data read from a developed photographic film or image data photographed by an electronic camera into output image data for each primary color, and sends it to a signal processing section 10. The signal processing section 10 has therein a signal processing circuit for each exposure head. Each signal processing circuit of the signal processing section 10 is connected to corresponding exposure head 41, 51, and 61. Each signal processing circuit of the signal processing section 10 corrects the inputted output image data according to correction data, generates a driving control signal from corrected output image data, and sends the signal to the exposure heads 41, 51, and 61. The exposure heads 41, 51 and 61 are the exposure heads in which a plurality of light emitting portions are arranged one row of or a plurality of rows of dotted line-like, and each light emitting portion emits light according to the sent driving control signal.

In this connection, the exposure head 41 is the exposure head to expose the light of R, the exposure head 51 is the exposure head to expose the light of G, and the exposure head 61 is the exposure head to expose the light of B.

In the image recording apparatus, a magazine 21 is set in a predetermined direction and position, and accommodates a roll-like photographic paper 2 therein. A feeding roller pair 23 conveys the photographic paper pulled out of the magazine 21, so as to be pulled out or returned. An exposure unit 40 has an exposure head holding member 35 and exposure heads 41, 51, and 61, fixed to the exposure head holding member 35, and the exposure head holding member 35 is attached to an attaching member 34, which is a portion of the image recording apparatus main body.

An image is recorded by exposing the photographic paper 2, being conveyed by the feeding roller pair 23, by light emission of each light emitting portion of exposure heads 41, 51, and 61. A transparent glass plate 33 closely contacting with the photographic paper, is provided between the exposure heads 41, 51, 61 and photographic paper 2. The lower end surface of the transparent glass plate 33 is the exposure image forming surface of each of exposure heads 41, 51, and 61, and the photographic paper 2 is positioned on the exposure image forming surface by the transparent glass plate 33. The image recording apparatus has a pressing member 31 to position the photosensitive surface of the photographic paper 2 on the lower end surface of the transparent glass plate 33 when the photographic paper 2 is exposed. When the photographic paper 2 is exposed, the pressing member 31 presses the photographic paper 2 onto the transparent glass plate 33, and in other cases, the pressing member 31 is separated from the transparent glass plate 33.

A light receiving unit, (in the drawing, it is in a position in which it can not be seen because it is hidden behind the pressing member 31), which receives the light emission of the light emitting portion of a portion of exposure heads 41, 51, 61, and outputs light receiving data, is provided for each of exposure heads 41, 51 and 61, opposite to each of exposure heads 41, 51, and 61. In this connection, in the pressing member 31, a hole is provided in a position corresponding to the light receiving unit, so that the light receiving unit receives the light emission of the light emitting portion of a portion of exposure heads 41, 51, 61.

Figure 3:
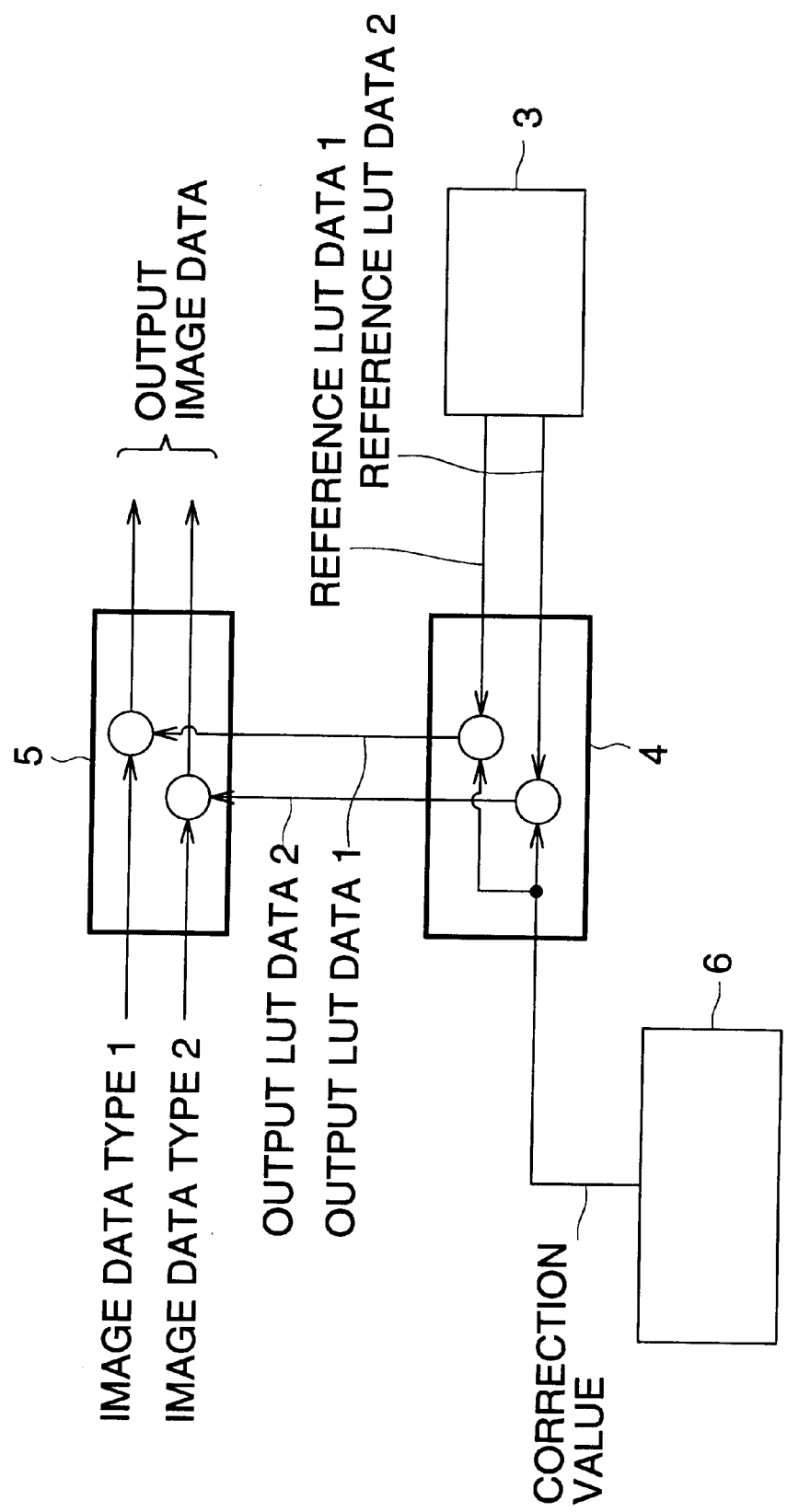
FIG. 3 is a conceptual block diagram of an image processing apparatus of Example 1.

As shown in FIG. 3, which is a block diagram of the image processing apparatus 1 of the present example, the image processing apparatus 1 has an output conversion section 5 to convert the inputted B, G, R image data by the output conversion LUT for each of B, G, R, corresponding to the kind of image data and to obtain B, G, R output image data; a reference LUT memory section 3 to store the reference LUT for each of B, G, R for each kind of image data which is the output conversion LUT to be the reference; a correction value obtaining section 6 to obtain the correction value for each of B, G, R; and an output conversion LUT calculation section 4 to calculate an output conversion LUT for each of B, G, R for each kind of image data from the reference LUT for each of B, G, R, corresponding to the kind of image data, stored by the reference LUT memory section 3, and the correction value for each of B, G, R, obtained by the correction value obtaining section 6. The output conversion section 5 converts B, G, R color image data by the output conversion LUT for each of B, G, R, corresponding to the kind of image data, calculated by the output conversion LUT calculation section 4, and obtains B, G, R output image data adapted to the characteristic of the signal processing section. The image processing apparatus 1 sends the obtained B, G, R output image data to a signal processing section 10.

In this connection, the correction value obtaining section 6 stores the B, G, R light receiving data, obtained by the light receiving unit, as the reference B, G, R light receiving data, under the condition that exposure heads 41, 51, and 61 are the reference. When the B, G, R light receiving data is outputted from the light receiving unit, the correction value obtaining section 6 obtains the correction value for each of B, G, R, according to the reference B, G, R light receiving data stored in the correction value obtaining section 6, and B, G, R light receiving data outputted from the light receiving unit.

Herein, the term "light receiving data" represents the intensity of the received light. In addition, the light receiving data may be obtained by adding the spectrum intensity of the received light with the spectrum sensitivity of the photographic paper 2. Further, since the spectrum intensity may be changed depending on the temperature of the exposing head or the temperature in the periphery of the exposing head, the temperature of the exposing head and the temperature in the periphery of the exposing head are measured and the spectrum intensity of the exposing head is corrected in accordance with the temperature. Then, the light receiving data may be obtained from the corrected spectrum intensity, the intensity of the received light and the spectrum sensitivity of the photographic paper 2.

As the method of obtaining correction values, the following method may be used. That is, the relationship between the product value, which is called as light receiving efficiency of the photographic paper 2, of the spectrum intensity and the spectrum sensitivity is determined in advance for the temperature change on the exposing head and in the periphery of the exposing head, correction values are obtained by the measured temperature of the exposing head and the measured temperature in the periphery of the exposing head.

In the case where B, G, R output image data is expressed by the antilogarithm value, when inputted B, G, R data is expressed by Dxy, and the output conversion LUT for each of B, G, R is expressed by F(D), the output conversion section 5 converts the inputted B, G, R image data Dxy into F(Dxy) by the output conversion LUT for each of B, G, R. Further, when the reference LUT for each of B, G, R is expressed by f(D), and the correction value for each of B, G, R is expressed by C, the output conversion LUT calculation section 4 is a multiplying unit to obtain F(D) for each kind of image data, which is the output conversion LUT, by the following equation.

$$F(D)=C \times f(D)$$

Incidentally, since the above equation brings its greatest effect in the case that the density fluctuation characteristics of the image outputting apparatus is almost uniform over the entire gradation range of an image, the best output characteristic correction effect may be obtained in the case that the image recording medium is a silver halide light sensitive material such as a photographic color paper and an image is outputted by exposing image light on the silver halide light sensitive material.

Exposure heads 51 and 61 are vacuum fluorescent print heads (VFPH) which are fluorescent display tube type having a fluorescent body to emit green-blue light. The exposure heads 51 and 61 have light emitting element groups in which 300 dpi, 2560 fluorescent body light emitting elements, made of zinc oxide florescent body (ZnO:Zn) which is a simultaneously light emittable light emitting section, are arranged linearly, and a Selfoc lens array, which is a collective body of lenses having the lens function for each fluorescent body light emitting element, is arranged in a predetermined position in front of the light emitting elements. A blue filter (LEE filter 181, sold by Konica color mechanical equipment co.) is provided on the transparent glass plate 33 surface opposing to the exposure head 61, and B light is exposed. A yellow filter (LEE filter HT015, sold by Konica color mechanical equipment co.) is provided on the transparent glass plate 33 surface opposing to the exposure head 51, and G light is exposed.

Figure 4:
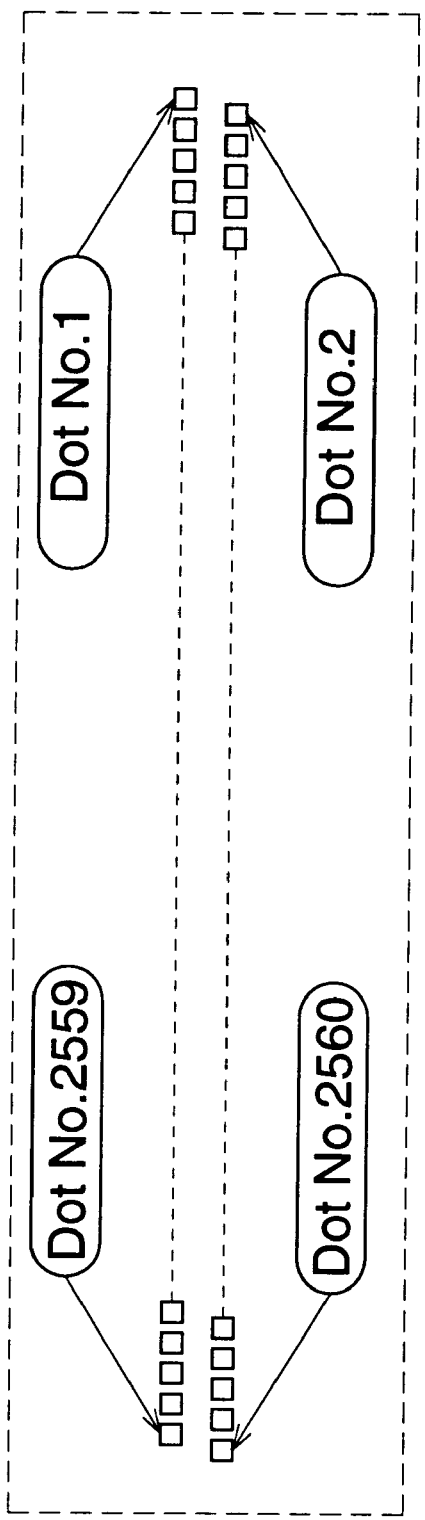
FIG. 4 is a conceptual arrangement diagram of light emitting portions of exposure heads 51 and 61 of Example 1.

A conceptual arrangement view of the light emitting portion of the exposure heads 51 and 61 is shown in FIG. 4. The exposure head has a recording head having 2560 light emitting portions (Dot No. 1 to No. 2560) arranged as shown in FIG. 4. The arrangement of the light emitting portions of the recording head is as follows. Odd numbered light emitting portions (Dot No. 1 to No. 2559) and even numbered light emitting portions (Dot No. 2 to No. 2560) are respectively arranged dotted line-like at regular intervals, and these two dotted lines are arranged zigzag.

The exposure head 41 has 300 dpi 2560 light emitting portions, which are LED light emitting elements with the peak wavelength of 665 nm, and has an LED array in which these light emitting portions are arranged one row of dotted line-like at regular intervals. The Selfoc lens array, which is a collective body of lenses having the lens function for each LED light emitting element, is arranged in a predetermined position in front of the light emitting element group.

Next, a photographic paper 2, which is exposed by the image recording apparatus, will be explained. As the photographic paper 2, a color photographic paper is preferable which has a photosensitive layer respectively photosensitive to primary colors of R, G, B, such as a color photographic paper having a layer photosensitive to R light, on which color of cyan comes out, a layer photosensitive to G light, on which color of magenta comes out, and a layer photosensitive to B light, on which color of yellow comes out, and a color negative photographic paper, or a color positive photographic paper may also be allowable.

Next, a calculation method of the output conversion LUT of the image processing apparatus will be explained. Initially, the image recording apparatus obtains the B, G, R output conversion LUT, according to light emission of exposure heads 41, 51, 61, at every predetermined time interval (for example, every predetermined time of every day). The light emitting portion of exposure heads 41, 51, 61 emits the light by a predetermined output control signal, the light emission is received by the light receiving unit, and B, G, R light receiving data is obtained. Then, the correction value obtaining section 6 obtains correction values for B. G, R, according to B, G, R light receiving data which is stored in the correction value obtaining section 6, and is the reference, and B, G, R light receiving data outputted by the light receiving unit. In the output conversion LUT calculation section 4, the B, G, R reference LUT, stored in the reference LUT memory section 3, and the obtained B. G, R correction values are multiplied and the output conversion LUT is obtained. The obtained B, G, R output conversion LUT is set to the output conversion section 5.

Figure 9:
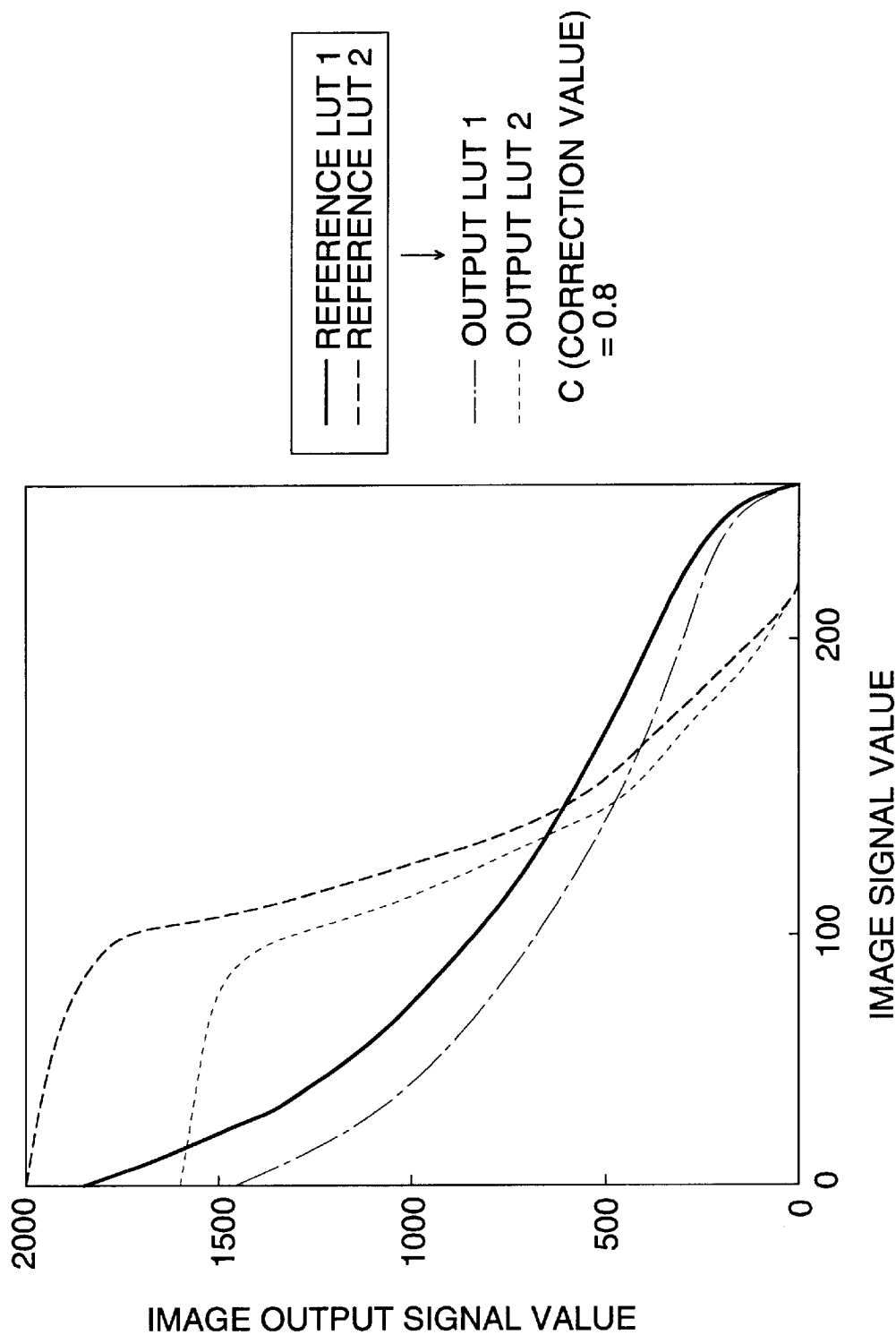
FIG. 9 is a diagram showing an example of the output conversion obtained from a reference value and correction values.

FIG. 9 is a diagram showing an example of the output conversion LUT which is obtained from a reference LUT and correction values and is a converting condition used in the present embodiment. In FIG. 9, "reference LUT 1" is a reference LUT having a characteristic to convert image signal values inputted by an electronic camera into output image signal values and "reference LUT 2" is a reference LUT having a characteristic to convert image signal values read from a developed photographic film into output image signal values. Herein, if C (correction value)=0.8 in the result of obtaining the correction value as stated above, an output conversion LUT to convert an image inputted by the electronic camera is converted into "output LUT 1", and an output conversion LUT to convert an image read from the photographic film is converted into "output LUT 2". With this technique, by obtaining a single correction value, the photographic quality of two kinds of image sources can be maintained simultaneously. Further, even for three kinds of image sources or more, since it may be obvious that the similar processing can be applied, the detailed explanation can be omitted.

EXAMPLE 2

The present example 2 is different from Example 1, only in one portion of the image processing apparatus 1 and a method to obtain the correction value for each of B, G, R, and the other portions are the same as those of Example 1. Only different points from Example 1 will be described below.

Figure 5:
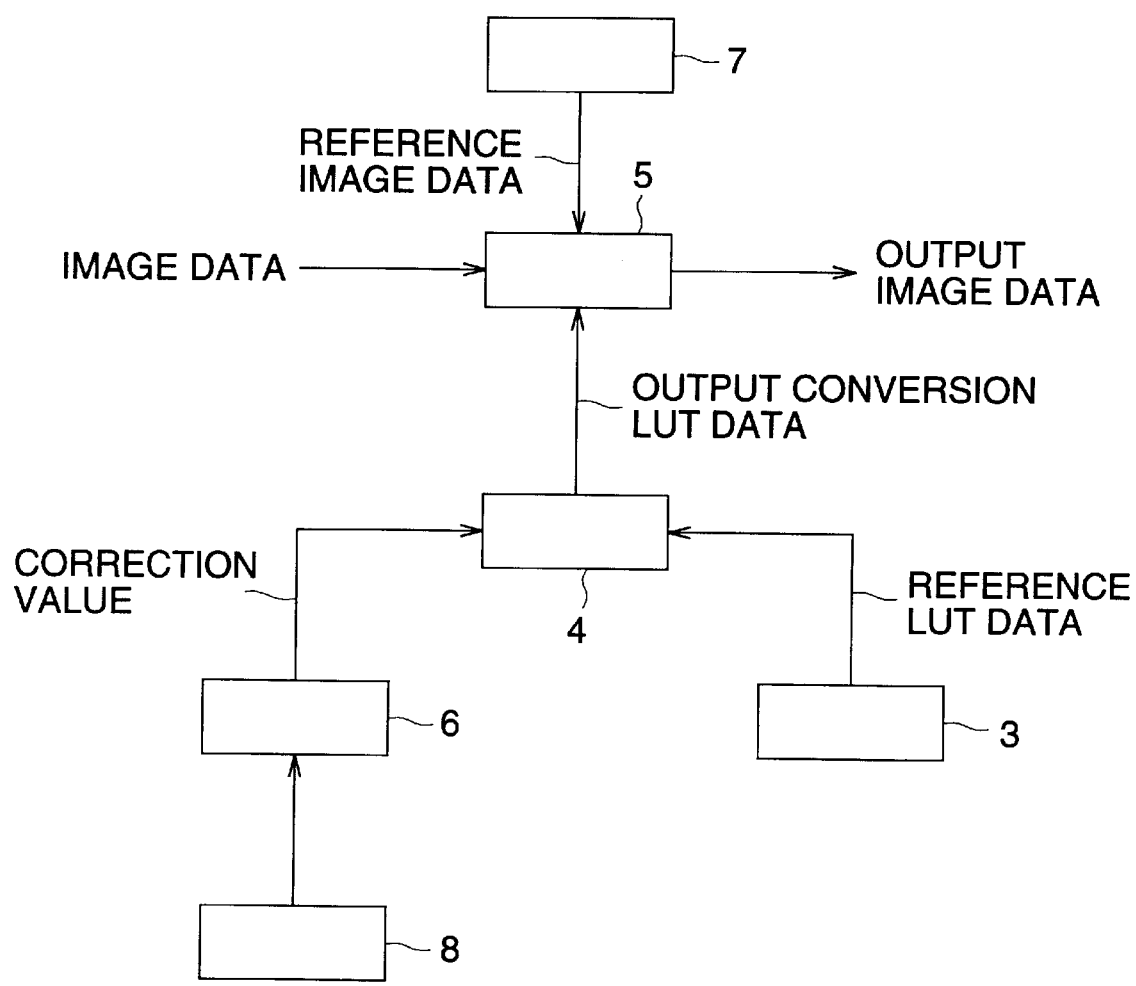
FIG. 5 is a conceptual block diagram of the image processing apparatus of Examples 2 and 3.

As shown in FIG. 5, the image processing apparatus of the present example has a reference image data memory section 7 to store B, G, R reference image data, which is connected to the output conversion section 5, and sends the B, G, R reference image data stored in the reference image data memory section 7 to the output conversion section 5 by the control signal. Further, the apparatus has a key board, and a key input section 8 to input information from the key board, which is connected to the correction value obtaining section 6, and the information inputted by the key input section 8 is sent to the correction value obtaining section 6. The correction value obtaining section 6 stores the correspondence between density information previously inputted by the key input section 8 and correction value, and obtains the corresponding correction value, according to the density information inputted by the key input section 8, and sends the correction value to the output conversion LUT calculation section 4.

In this connection, the B, G, R reference image data is data to output a mono-color image of almost neutral color. For example, reference image data is listed by which a test print of a mono-color image of the neutral color of density DM having equal B, G, R density which is a target, is obtained. Incidentally, from the view point of the accuracy of density measurement by a densitometer, or easiness of visual judgment, the density DM is preferably not less than 0.5, (specifically, not less than 0.7), and preferably not more than 1.5, (specifically, not more than 1.0), and for example, 0.8 is given.

Then, a maintenance man periodically patrols the mounted place of the image recording apparatus, and by the operation of the maintenance man, the output conversion section 5 of the image processing apparatus of the present example obtains B, G, R reference output image data from B, G, R reference image data stored in the reference image data memory section 7. The image processing apparatus 1 sends the obtained B, G, R reference output image data to the signal processing section 10, the image is outputted by the reference output image data, and the test print is obtained.

Then, the maintenance man measures the B, G, R density of the obtained test print by the densitometer, and the result of measurement by the densitometer is key-inputted by the key input section 8. The correction value obtaining section 6 obtains the correction value for each of B. G, R from the correspondence between the above-described B, G, R density information and the B, G, R correction value, which are previously stored, according to the key-inputted density information.

Hereinafter, in the same manner as Example 1, the output conversion LUT is renewed.

EXAMPLE 3

The present example 3 is different from Example 1, only in one portion of the image processing apparatus 1 and a method to obtain the output conversion LUT, and the other portions are the same as those of Example 1. Only different points from Example 1 will be described below.

As shown in FIG. 5, the image processing apparatus of the present example has a reference image data memory section 7 to store B, G, R reference image data, which is connected to the output conversion section 5, and sends the B, G, R reference image data stored in the reference image data memory section 7 to the output conversion section 5 by the control signal. Further, the apparatus has a key board, and a key input section 8 to input information from the key board, which is connected to the correction value obtaining section 6, and the information inputted by the key input section 8 is sent to the correction value obtaining section 6. The correction value obtaining section 6 houses therein a memory section to previously store the correction value for each combination of mono-color images between the test print and the standard chart print, and obtains the correction value corresponding to combination information of the mono-color images between the test print and the standard chart print, in which the combination information is inputted by the key input section 8, and the obtained correction value is sent to the output conversion LUT calculation section 4.

Figure 8:
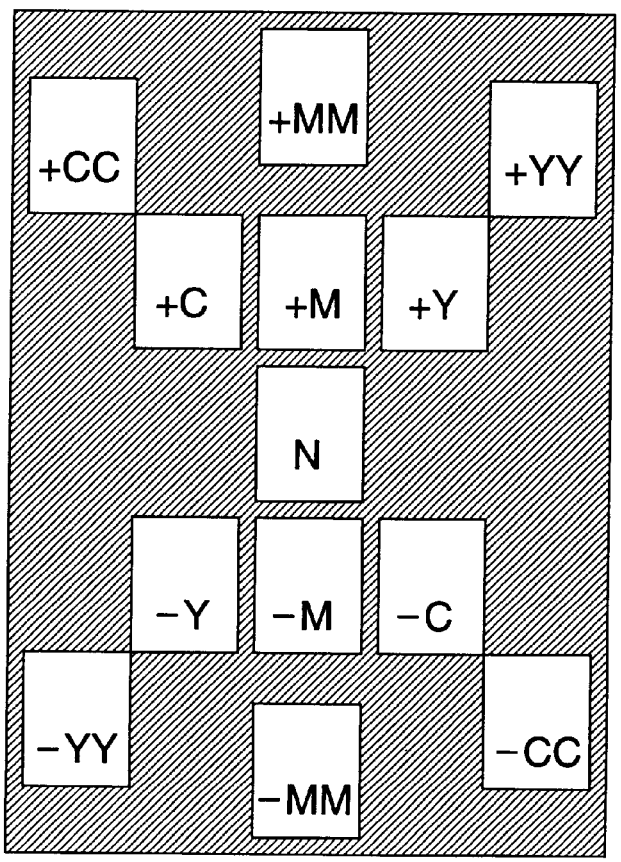
FIG. 8 is a view showing a standard chart print of Example 3.

In this connection, as shown in FIG. 8, in the standard chart print, a plurality of mono-color images, in which the image color is different from each other, and the neutral color density is equal, are arranged. Specifically, because the mono-color images are arranged in the shape of ring around, visual discrimination is easy. For example, the standard chart print has the following mono-color image areas: the mono-color image area of neutral color of density DMN, on which a symbol [N] is marked and in which B, G, R density is equal; a little Y colored mono-color image area on which a symbol [−Y] is marked and in which G and R density is equal and lower than B density; the slightly Y-colored mono-color image area on which a symbol [−YY] is marked and in which G and R density is equal and lower than B density (the density difference is larger than that of the area on which the symbol [−Y] is marked); a little B-colored mono-color image area on which a symbol [+Y] is marked, and in which G and R density is equal and higher than B density; the slightly B-colored mono-color image area on which a symbol [+YY] is marked and in which G and R density is equal and higher than B density (the density difference is larger than that of the area on which the symbol [+Y] is marked); a little M-colored mono-color image area on which a symbol [−M] is marked and in which B and R density is equal and lower than G density; the slightly M-colored mono-color image area on which a symbol [−MM] is marked and in which B and R density is equal and lower than G density (the density difference is larger than that of the area on which the symbol [−M] is marked); a little B-colored mono-color image area on which a symbol [+M] is marked and in which B and R density is equal and higher than G density; the slightly G-colored mono-color image area on which a symbol [+MM] is marked and in which B and R density is equal and higher than G density (the density difference is larger than that of the area on which the symbol [+M] is marked); a little C-colored mono-color image area on which a symbol [−C] is marked and in which B and G density is equal and lower than R density; the slightly C-colored mono-color image area on which a symbol [−CC] is marked and in which B and G density is equal and lower than R density (the density difference is larger than that of the area on which the symbol [−C] is marked); a little R-colored mono-color image area on which a symbol [+C] is marked and in which B and G density is equal and higher than R density; and the slightly R-colored mono-color image area on which a symbol [+CC] is marked and in which B and G density is equal and higher than R density (the density difference is larger than that of the area on which the symbol [+C] is marked).

Figure 7:
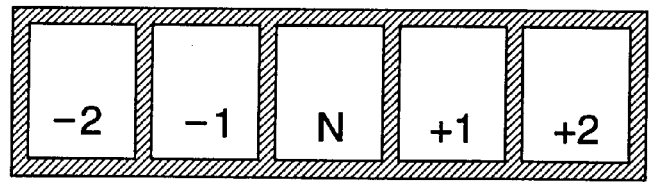
FIG. 7 is a view showing a test print of Example 3.

B, G, R reference image data is the data to output a plurality of mono-color images of almost neutral color in which the neutral color density is different from each other. For example, as shown in FIG. 7, the reference image data is given by which the test print having the following areas can be obtained: the mono-color image area of the neutral color of the density DM−2, on which a symbol [−2] is marked and in which B, G, R density, which is a target, is equal; the mono-color image area of the neutral color of the density DM−1 (which is higher than the density DM−2), on which a symbol [−1] is marked and in which B, G, R density, which is a target, is equal; the mono-color image area of the neutral color of the density DMN, on which a symbol [N] is marked and in which B, G, R density, which is a target, is equal; the mono-color image area of the neutral color of the density DM+1 (which is higher than the density DMN), on which a symbol [+1] is marked and in which B, G, R density, which is a target, is equal; and the mono-color image area of the neutral color of the density DM+2 (which is higher than the density DM+1), on which a symbol [+2] is marked and in which B, G, R density, which is a target, is equal. As the density DM−2, DM−1, DMN, DM+1, DM+2, it is preferable from the viewpoint of easiness of visual review that the central density DMN is not less than 0.7 and not more than 1.0. For example, the following is given: the density DMN is 0.8, and each of the density DM−2, DM−1, DMN, DM+1, DM+2, has 5% difference in exposure value to the adjoining density, in which the density DMN area is the center.

Figure 6:
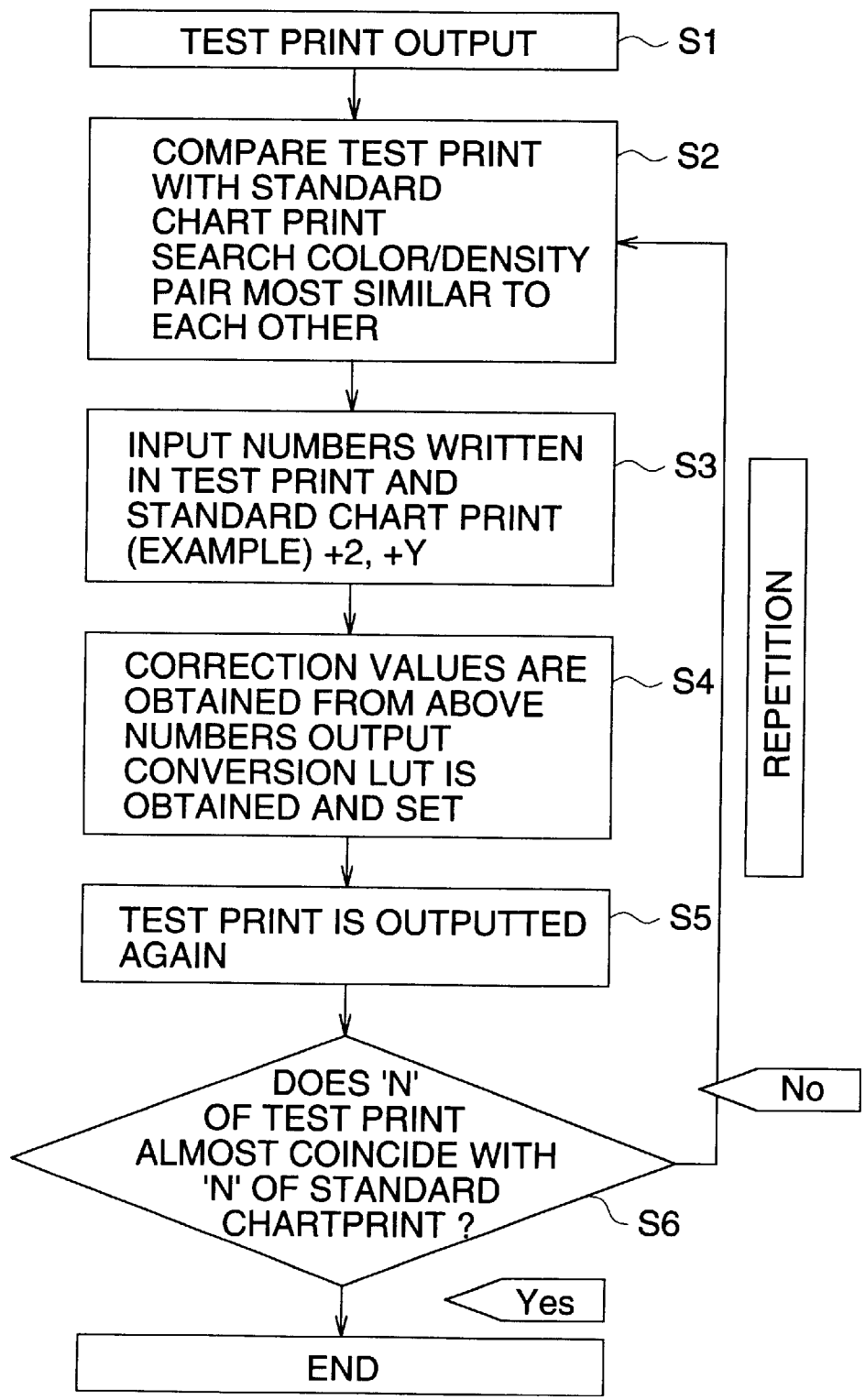
FIG. 6 is a flow chart to obtain an output conversion LUT of Example 3.

Next, according to a flow chart shown in FIG. 6, a flow to calculate the correction value will be explained below. Initially, at the step S1, the maintenance man periodically patrols the mounted place of the image recording apparatus. By the operation of the maintenance man, the output conversion section 5 of the image processing apparatus of the present example obtains B, G, R reference output image data from the B, G, R reference image data, stored by the reference image data memory section 7, and the image processing apparatus 1 sends the obtained B, G, R reference output image data to the signal processing section 10, outputs the image according to the reference output image data, and outputs the test print having the mono-color image area of the neutral color, having 5 different density.

Then, at the step S2, the maintenance man visually compares the standard chart print, on which a plurality of mono-color images are recorded, and in which the neutral color density is equal to each other and image tone is different, with the obtained test print, and finds a combination of mono-color images between the test print and the standard chart print, in which colors coincide best with each other.

At the step S3, the found combination of mono-color images between the test print and the standard chart print, in which colors coincide best with each other, is key-inputted by the key input section 8.

At the step S4, the correction value obtaining section 6 obtains correction values of B, G, R from the information stored in the memory section in which the correction value is previously stored, for each of the combinations of mono-color images between the test print and the standard chart print, according to the key-inputted information of combination of mono-color images between the test print and the standard chart print. Then, the output conversion LUT calculation section 4 multiplies B, G, R reference LUT, stored in the reference LUT memory section 3, by the obtained B, G, R correction value, and obtains the output conversion LUT. The obtained B, G, R output conversion LUT is set to the output conversion section 5.

At the step S5, by the operation of the maintenance man, the output conversion section 5 of the image processing apparatus of the present example obtains B, G, R reference output image data from the B, G, R reference image data, stored by the reference image data memory section 7, and the image processing apparatus 1 sends the obtained B, G, R reference output image data to the signal processing section 10, outputs the image according to the reference output image data, and outputs the test print having the mono-color image area of the neutral color, having 5 different density.

At the step S6, it is judged whether the mono-color image of density DM3 of the test print outputted at the step SS, nearly coincides with the mono-color image of the neutral color of the standard chart print, or not. If these two coincide with each other, the sequence comes to an end, and if not, the sequence returns to the step S2, and processing at the step S2 is carried out according to the test print outputted at the step S5.

Herein, when the correction value is obtained in the step S4, if the correction value obtained from the first test print is represented as C1 and the correction value obtained by comparing the second test print with the reference chart print is represented as C2, the correction value C to be used for the third test print output may be obtained by combining the first one and the second one by the following formula.

$$C = C1 \times C2$$

If further continuing to the "n-th" time, the formula is represented as follows.

$$C = C1 \times C2 \times \ldots \times Cn$$

Further, if the correction value C0 is obtained preliminarily by measuring the light amount of an image writing exposure head as Embodiment 1, the correction value C0 is used for the first test print and the correction value C in the second time can be obtained by the following formula:

$$C = C0 \times C1$$

Similarly, the correction value C for the "n-th" time can be obtained by the following formula:

$$C = C0 \times C1 \times \ldots \times Cn$$

Hereinafter, the output conversion LUT is renewed in the same manner as in Example 1.

According to the present invention, the output conversion LUT can be easily obtained, and can cope with the variation of the output level of a specific image output apparatus.

What is claimed is:

1. An image recording apparatus, comprising:
   image processing means for converting plural color component input image data into plural color component output image data; and image recording means for forming plural color component images on a recording sheet based on the plural color component output image data;

wherein the image processing means comprises:

a memory for memorizing a reference converting condition for each color component, correction value obtaining means for inputting reference input test data into the image recording means, for obtaining plural color component actual recording test data from the image recording means, and for obtaining a correction value for the image recording means for each color component based on plural color component reference recording test data and the plural color component actual recording test data, converting condition calculating means for calculating an output converting condition for each color component based on both the reference converting condition for each color component and the correction value obtained for each color component, and converting means for converting the plural color component input image data into the plural color component output image data based on the calculated output converting conditions.

2. The image recording apparatus of claim 1, wherein the recording sheet comprises a light sensitive material, and the image recording means comprises exposure heads corresponding to the plural color components and a conveyor to convey the light sensitive material relatively to the exposure heads, and wherein the correction value obtaining means comprises a light receiving device which receives light emitted from each exposure head and outputs light amount data of each exposure head as the plural color component actual recording test data, and the correction value obtaining means obtains the correction value for each color component based on the light amount data.

3. The image recording apparatus of claim 2, wherein the memory memorizes a reference light amount data as the plural color component reference recording test data and the correction value obtaining means obtains the correction values based on the light amount data and the reference light amount data.

4. The image recording apparatus of claim 1, wherein the memory memorizes a reference output image data as the reference input test data, the image recording means forms a test print based on the reference output image data, and the correction value obtaining means obtains the correction values based on density information of the test print as the plural color component actual recording test data.

5. The image recording apparatus of claim 1, wherein the memory memorizes a reference output image data as the reference input test data, and the recording means forms a test print based on the reference output image data, wherein the apparatus further comprises coincidence information inputting means having plural reference chart prints with which the test print is compared so as to select a similar reference chart print, and wherein the coincidence information inputting means inputs a combination of the test print and the selected similar reference chart print, the memory memorizes correction values for each combination of the test print and the reference chart print, and the correction value obtaining means obtains correction values corresponding to the inputted combination from the memory.

6. The image recording apparatus of claim 5, wherein the memory memorizes plural reference output image data as the reference input test data, the recording means forms plural test prints based on the plural reference output image data, and the plural test prints are compared with the plural reference chart prints so as to select a particular combination of one of the test prints and a similar one of the reference chart prints.

7. The image recording apparatus of claim 6, wherein the plural reference image data comprise data for forming plural mono-color images which are almost a similar neutral color and different in neutral color density from each others and the plural reference chart prints are recorded as plural mono-color images which are different in color tone from each other and equal in neutral color density to each other.

8. The image recording apparatus of claim 6, wherein the plural reference image data comprise data for forming plural mono-color images which are different in color tone from each other and equal in neutral color density to each others and the plural reference chart prints are recorded as plural mono-color images which are almost a similar neutral color and different in neutral color density from each other.

9. The image recording apparatus of claim 1, wherein the memory memorizes plural reference output image data as the reference input test data, and the recording means forms plural test print based on the reference output image data, wherein the apparatus further comprises coincidence information inputting means having a reference chart print with which the plural test prints are compared so as to select a similar test print, and wherein the coincidence information inputting means inputs a combination of the selected similar test print and the reference chart print, the memory memorizes correction values for each combination of the test print and the reference chart print, and the correction value obtaining means obtains correction values corresponding to the inputted combination from the memory.

10. The image recording apparatus of claim 1, wherein the memory memorizes plural reference output image data as the reference input test data, and the recording means forms plural test print based on the reference output image data, wherein the apparatus further comprises coincidence information inputting means having plural reference chart prints with which the plural test prints are compared so as to select a combination of a test print and a reference chart print which are similar to each other, and wherein the coincidence information inputting means inputs the combination of the test print and the reference chart print, the memory memorizes correction values for each combination of the test print and the reference chart print, and the correction value obtaining means obtains correction values corresponding to the inputted combination from the memory.

11. The image recording apparatus of claim 1, wherein in the case that the plural color component output image data are expressed by antilogarithm values, the output converting condition F(D) is obtained by the following equation:

$$F(D) = c \times f(D)$$

wherein the plural color component input image data are expressed by D, the correction value for each color component is expressed by c and the reference converting condition is expressed by f(D).

12. The image recording apparatus of claim 1, wherein the color components include blue, green and red.

13. The image recording apparatus of claim 1, wherein the image recording means comprises means for exposing a silver halide light sensitive material so as to form the color image.

14. The image recording apparatus of claim 1, wherein the memory memorizes plural reference converting conditions, and the converting condition calculating means calculates plural output converting conditions based on the plural reference converting conditions and the correction values.

15. The image recording apparatus of claim 1, wherein the image processing means is adapted to receive plural different types of the plural color component input image data, the memory memorizes the reference converting condition for each color component of each type of the plural color component input image data, and the converting condition calculating means calculates the output converting condition for each color component of each type of the plural component input image data.

* * * * *